May 14, 1968

C. W. FOLLEY 3,382,624

OSCILLATORY HOLDER ATTACHMENT

Filed March 21, 1966

May 14, 1968  C. W. FOLLEY  3,382,624
OSCILLATORY HOLDER ATTACHMENT
Filed March 21, 1966  3 Sheets-Sheet 2
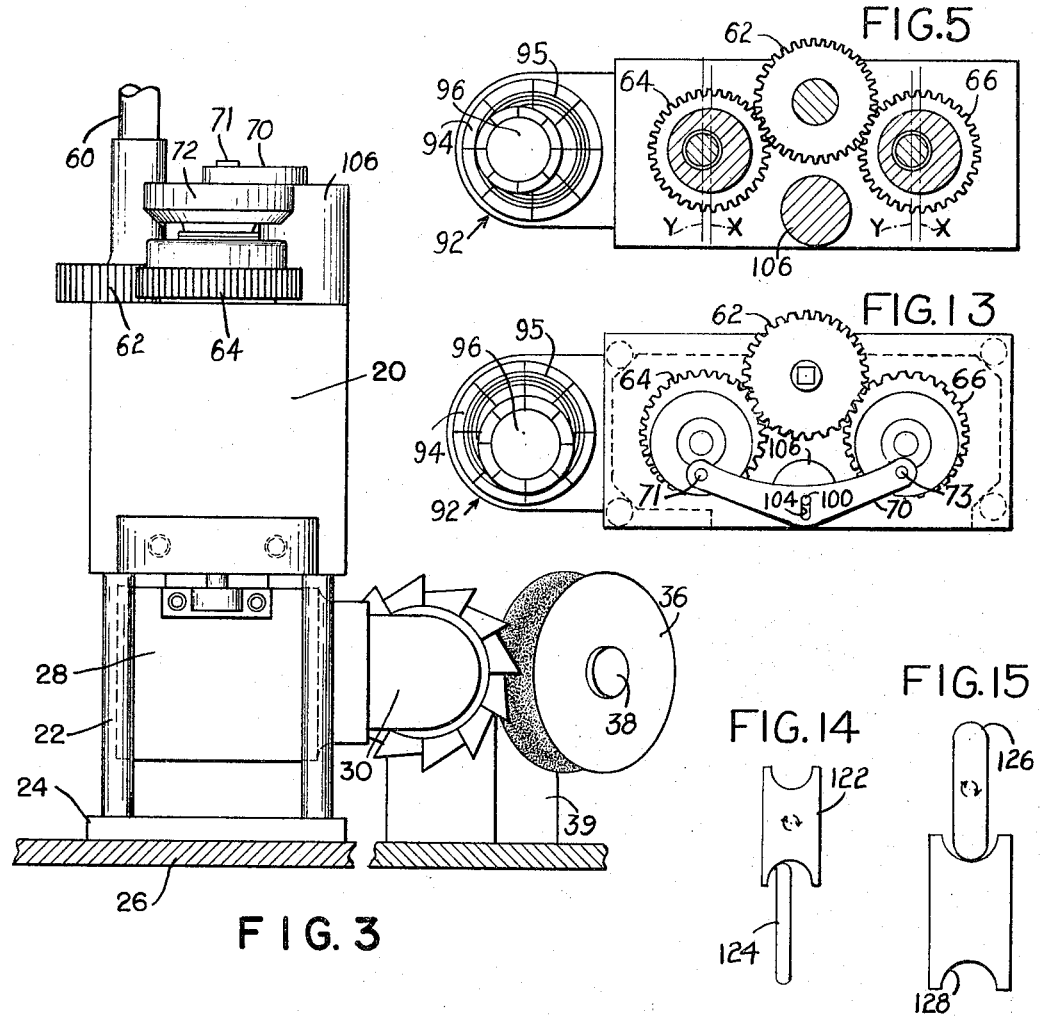
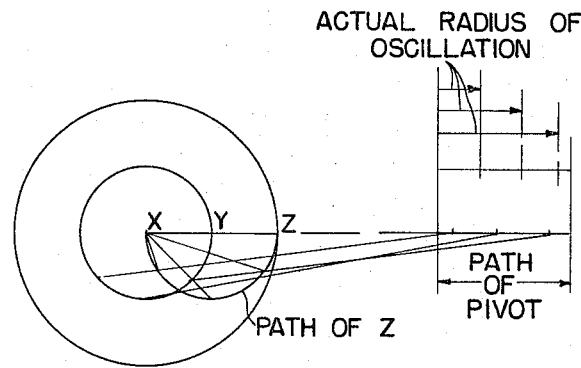

May 14, 1968     C. W. FOLLEY     3,382,624

OSCILLATORY HOLDER ATTACHMENT

Filed March 21, 1966     3 Sheets-Sheet 3

United States Patent Office 3,382,624
Patented May 14, 1968

3,382,624
OSCILLATORY HOLDER ATTACHMENT
Cranston Wesley Folley, Kennebunk, Maine, assignor to Maremont Corporation, Chicago, Ill., a corporation of Illinois
Filed Mar. 21, 1966, Ser. No. 536,017
10 Claims. (Cl. 51—237)

The present invention relates to an improved oscillatory holder attachment for the performance of grinding, work shaping and similar operations upon curved surfaces.

The illustrated construction is an improvement upon the apparatus shown in applicant's prior Patents Nos. 3,030,739 and 3,076,295 which teach a method and apparatus for moving a grinding wheel and a work piece relatively thereto in a manner to generate a concave circular toroidal surface on a work piece.

The invention is herein disclosed in a preferred form as embodied in an oscillatory holder attachment for use in a machine of the general type having two relatively movable supports constructed and arranged for relative translatory and forward and back positioning movements for the performance of grinding and similar work shaping and finishing operations upon a work piece mounted on one of said supports.

It is a principal object of the invention to provide an oscillatory holder attachment adapted for oscillatory movement bodily on parallel eccentric spindles, which is of novel and improved construction and is well adapted for the performance of a wide variety of grinding, work shaping and similar operations upon curved work surfaces.

More specifically, it is an object of the invention to provide in an oscillatory holder attachment of this description a novel mechanism for effecting a ready adjustment of the degree of eccentricity of the oscillating mechanism.

It is another object of the invention to provide for use in an oscillatory holder attachment of this description a novel direction indicator for use in setting up the attachment for the performance of any particular grinding, work shaping or similar operation.

The several features, constructions and advantages of the invention will be readily apparent to one skilled in the art from the following description and accompanying drawings in which:

FIG. 3 is an end view of the oscillatory holder attachment shown in FIG. 1;

FIG. 4 illustrates diagrammatically and on an enlarged scale the adjustment of the radius of oscillation effected by rotation of the supporting sleeve relative to the spindle supporting eccentric bearing held against rotation by a pivot pin movable toward and away from the rotational axis of said sleeve along a fixed guideway;

FIG. 5 is a detail plan view partly in section taken on a line 5—5 of FIG. 2;

FIG. 13 is a plan view of the grinding holder attachment illustrating the mechanism for locking the eccentric spindles and tie rod against rotation with the driving sleeves during adjustment of the radius of oscillation of the attachment;

FIG. 14 is a diagrammatic detail view illustrating the operation of grinding a concaved milling cutter having a radius of eccentricity as indicated by the curved arrows; and FIG. 15 is a diagrammatic detail view illustrating the operation of grinding a convex cutter of semi-circular outline, having a radius of eccentricity as indicated by the curved arrows.

Figure 1:
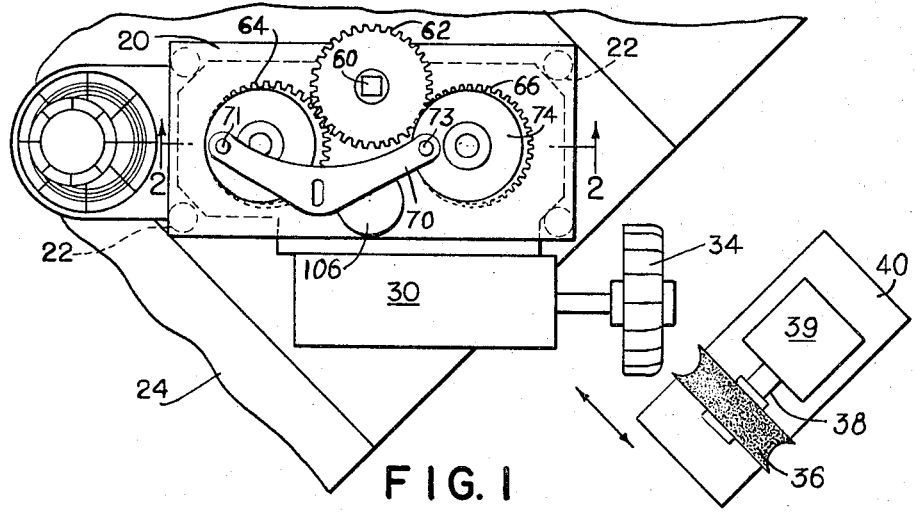
FIG. 1 is a plan view of an oscillatory holder attachment embodying in a preferred form the several features of the invention, set up for operation at a 45° angle upon the work table of a grinding machine.

Referring to the drawings the oscillatory holder attachment illustrated as embodying in a preferred form the several features of the invention comprises a rectangular housing 20 mounted on four corner posts 22 extending upwardly from a base plate 24 adapted to be mounted for example, on the work table 26 of a grinding machine. A rectangularly shaped oscillatory support 28 is suspended from the housing 20, for mounting thereon the work element involved in the grinding operation to be performed with the assistance of this attachment.

In the embodiment shown the oscillatory support 28 has formed thereon at one side thereof a semi-cylindrical horizontally disposed extension 30 which provides support for a work supporting spindle 32. By way of example a milling cutter 34 is mounted on the spindle 32. A grinding wheel 36 mounted on a spindle 38 rotatably mounted in a housing 39 carried on a spindle bearing support 40 is generally illustrated in FIGS. 1 and 3. The work table 26 and grinding wheel spindle bearing support 40 indicated in FIGS. 1 and 3 of the drawings form elements of a conventional grinding machine adapted for relative movement toward and away from each other along the line of the double arrow in FIG. 1, and also for translatory movement along an axis at right angles to said double arrow. It will be understood that the oscillating holder of the present invention, while shown as an attachment to be mounted on a suitable machine tool having relatively movable work and grinding wheel supports, may alternatively be incorporated as an integral element of such a machine.

The oscillatory support 28 is carried on the depending ends of two parallel spindles 44, 46 (see FIG. 2) mounted for oscillatory movement in eccentric bores formed respectively in two parallel eccentric driving sleeves 48, 50. The sleeve 48 is rotatably and axially supported in oppositely tapered bearings 52, 54. Sleeve 50 is similarly mounted in taper bearings 56, 58. The eccentric driving sleeves 48 and 50 are continuously driven in the same direction through connections which comprise a short vertical drive shaft 60 having mounted thereon a pinion 62 which meshes with a pinion 64 attached to the upper end of the eccentric driving sleeve 48 and with a pinion 66 attached to the upper end of driving sleeve 50. The shaft 60 is continuously driven from any convenient source of power not shown.

The spindles 44, 46 are connected to be maintained always in the same angular relation to one another by means of a tie bar 70 having pivotal connections 71, 73 respectively with sleeve elements 72, 74 keyed respectively to the upper ends of the spindles 44, 46. The spindle 44 is normally secured to turn as a unit with the supporting eccentric driving sleeve 48 by means of a clamping nut 76 which is threaded to the upper end of the spindle to bear against the upper face of the sleeve element 72, which is forced downwardly while the spindle 44 is urged upwardly causing a friction taper surface 77 of the sleeve element 72 to engage in a taper socket 78 in the upper end of the driving sleeve 48 and a taper bearing surface 79 on the spindle 44 to engage within a taper socket 80 formed in the lower end of the driving sleeve 48. The spindle 46 is similarly secured to turn with the eccentric driving sleeve 50 by means of a clamping nut not shown. The spindle 44 is provided with an offset downward extension 84 which is connected by end thrust taper bearings 86 eccentric to the axis of the spindle to effect the desired oscillatory movement of the oscillatory movement of the oscillatory support 28. The spindle 46 is similarly provided with an offset downward extension 88 and taper end thrust bearings 90 connecting the spindle 46 to the oscillatory support 28.

Figure 2:
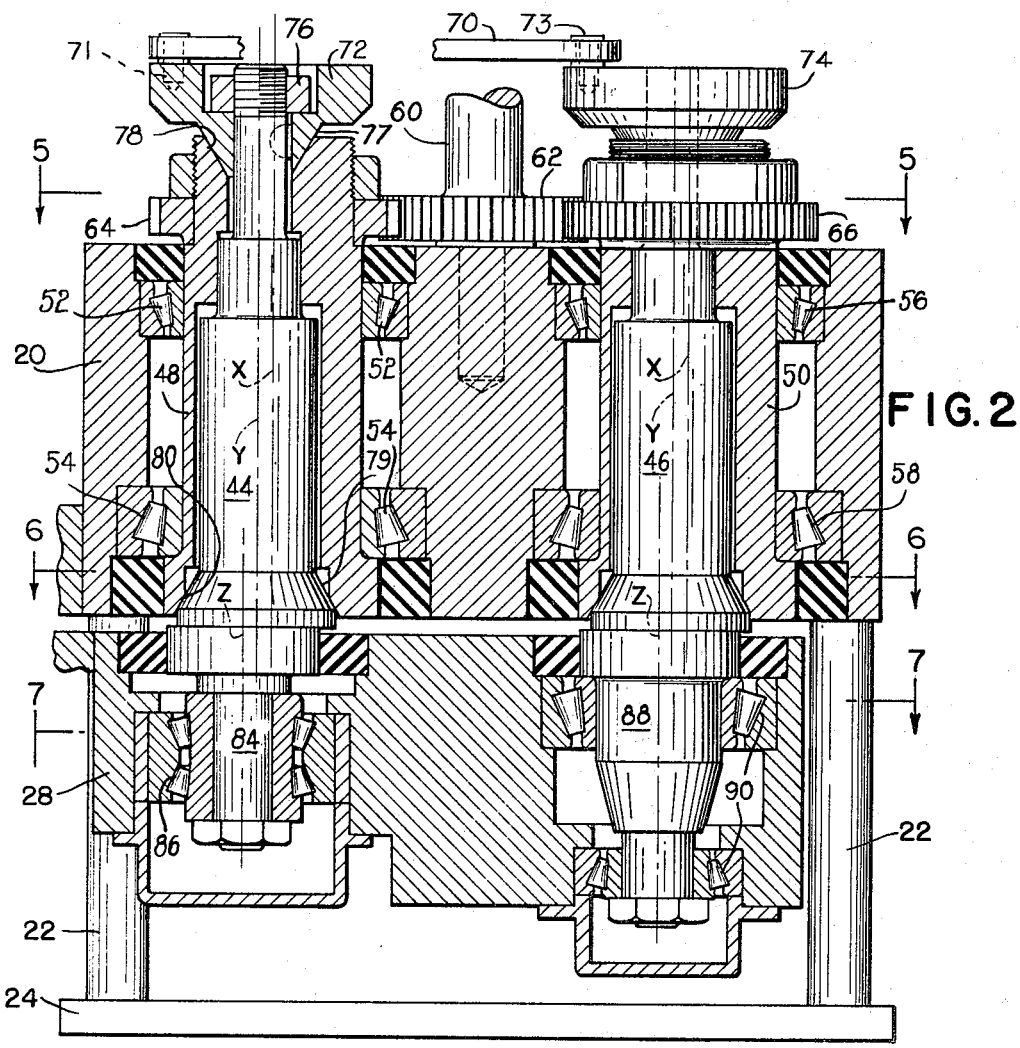
FIG. 2 is a vertical section taken on a line 2—2 of FIG. 1, but an enlarged scale illustrating particularly the pair of oscillation producing elements, the oscillating holder driven thereby, and the support housing of the attachment.
Figure 6:
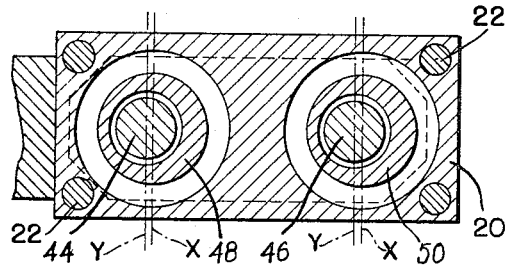
FIG. 6 is a detail sectional plan view taken on a line 6—6 of FIG. 2.
Figure 7:
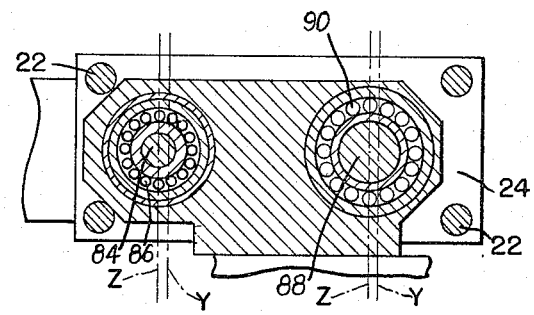
FIG. 7 is a detail sectional plan view taken on a line 7—7 of FIG. 2.
Figure 8:
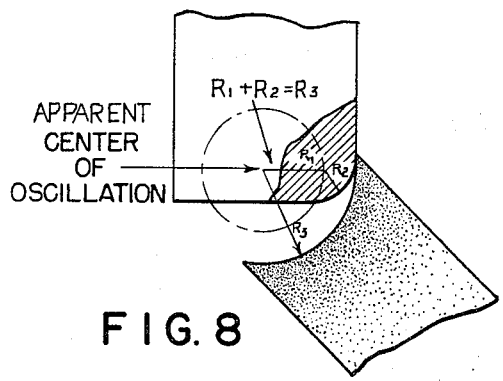
FIGS. 8 and 9 are diagrammatic views showing successive positions to which the work piece mounted in the oscillating holder attachment is moved during its traverse of the concave face of the grinding wheel.
Figure 9:
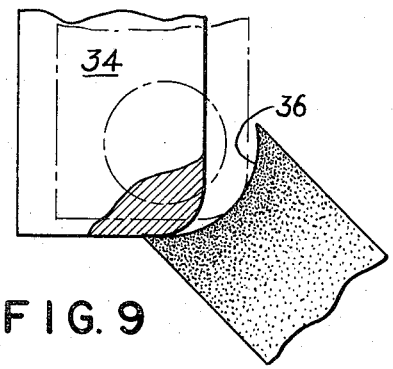

The axis of rotation of the eccentric driving sleeves 48, 50 is designated at X, the rotational axis of the spindles 44, 46 on their eccentric mountings is designated at Y, and the location of the axis of the offset downward extension and taper bearings of each spindle is indicated at Z (see FIGS. 2 and 4). The oscillatory support 28, supported on the downward extensions of spindles 44 and 46, will oscillate with the axes Z about the rotational axes X of the driving sleeves 48, 50. The radius of oscillation is determined by the degree of eccentricity of the axes Z with relation to the rotational axes X. Adjustment of the oscillating mechanism to the desired degree of eccentricity is obtained in the following manner:

The drive shaft 60 is first rotated to the position of FIG. 13 in which the tie bar 70 is in its extreme forward central position. This position is most readily established by reference to a direction dial indicator 92 mounted at the left of the grinding attachment comprising a flat ring shaped stationary dial element 94 having radial markings of 0°, 45°, 90°, 135°, and 180° and circular markings 95, which provide a direct reading of the eccentricity or radius of oscillation of the adjusted attachment. The dial element 94 is fixedly mounted on the stationary housing 20. A cooperating movable dial element 96 mounted on a bracket 98 on the oscillatory support 28 is adapted for oscillatory movement in overlying relation to the dial element 94. Radial markings of 0°, 45°, 90°, 135°, and 180° on the movable dial element 96 indicate the adjustment of the movable dial element 96 and oscillatory support 28 which will correspond with the direction of feed of the relatively movable machine supports 26, 40, and thereby insure the centering of the oscillations of the oscillatory support 28 and operating element mounted thereon with relation to the direction of feed of the machine on which the grinding attachment is mounted. The tie bar 70 and the spindles 44, 46 are now secured against rotational movement by the location of a pin 100 through a slot 104 in the tie bar 70 into a socket formed in a stationary post 106 mounted in the upper face of the housing 20. The clamping nuts 76, 82 are now backed off, so that the eccentric sleeves 48, 50 are free to rotate with relation to the angularly held spindles 44, 46.

Adjustment of the degree of eccentricity of the spindle offset bearings 86 and 90 with relation to the rotational axis X of the driving sleeves 48 and 50 is now effected by a rotational movement of the drive shaft 60 and the driving sleeves 48 and 50 driven thereby. The degree of eccentricity, or radius of oscillation, about axis X is indicated by the position of the tie bar 70 with relation to markings 108 on the top face of the post 106. An indication of said radius of oscillation is also given by the position of the movable indicator dial 96 relative to the circular markings 95. It will be noted that after adjustment has been made and the spindles are again secured to rotate with the respective bearing sleeves, the indication provided by the movable indicator dial remains the same as the oscillatory support 28 and movable dial continue to move in their oscillatory path.

The manner in which the adjustment of the radius of oscillation is effected is shown diagrammatically in FIG. 4. The pivotal connections 71, 73 between the cross bar 70 and each spindle are constrained by the pin 100, riding in slot 104 in the tie bar 70, to move in a straight line toward and away from the axis of rotation X of the eccentric driving sleeve 48. For the fully extended position of the tie bar 70 representing the position of maximum eccentricity of the axes Z, each offset spindle bearing axis Z and the offset axis Y of the driving sleeve as shown in FIG. 4, are located in the same straight line with the rotational axis X of the driving sleeve. As the eccentric driving sleeve 48 is rotated clockwise to successive positions, the spindle eccentric bearing axis Z always remains in line between the pivots 71, 73 and the central Y axis of the spindle which coincides with the eccentric axis of the driving sleeve 48. It will readily be seen from said diagram FIG. 4 that as the eccentric driving sleeve 48 turns through 180° the offset spindle pivot Z moves in a curved path from point Z to the axis X of the driving sleeve. The radius of oscillation represented by a line Z–X is thus gradually diminished to zero.

Figure 10:
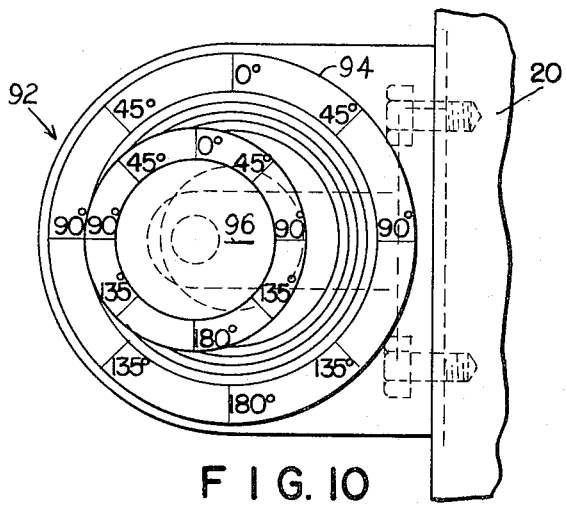
FIG. 10 is an enlarged detail plan view of the angle indicator shown in FIG. 1.
Figure 12:
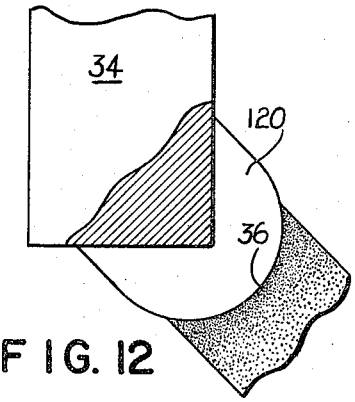
FIG. 12 is a fragmentary view illustrating the use of a template to center the work piece with relation to the curved grinding surface of the grinding wheel.
Figure 11:
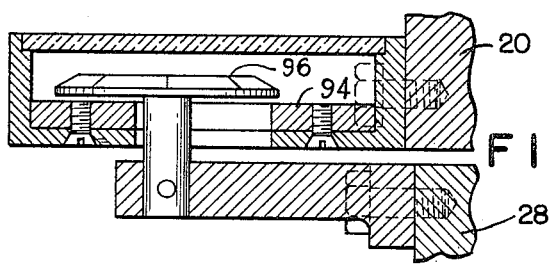
FIG. 11 is a sectional view of the angle indicator taken on a line 11—11 of FIG. 10.

A principal advantage of applicant's improved construction in which the oscillatory support 28 is rotated or oscillated bodily about a plurality of parallel centers consists in the fact that a work piece supported in any position on the oscillatory support 28 will move in exactly the same path. Further, the work piece may be placed at any desired angle with relation to the oscillatory support 28. The direction dial indicator 92 provides an exact determination of the angle at which the oscillatory holder attachment is mounted on a machine tool support for the performance of the desired grinding or similar work shaping operation. In the embodiment shown, for example, in FIG. 1 taken with FIG. 10 in which the attachment is mounted at a 45° angle on the slide 22 with relation to the direction of feed of the supports 22 and 40, the drive shaft 60 is rotated to bring the radial markings for 135° on each of the stationary dial 92 and the movable dial 96 into radial alignment. The support 22 can now be moved longitudinally to bring the center of curvature of the grinding wheel surface into exact alignment with the center of curvature to be imparted to the work piece. The template 120 shown in FIG. 12 provides a convenient means for bringing the work piece and arcuate grinding surface of the grinding wheel 36 into such alignment.

FIGS. 14 and 15 illustrate alternative embodiments of the invention, in which cutters of different shapes are being ground. FIG. 14 illustrates a cutter 122 which is concave in shape and is operated upon by a grinding wheel 124 having a convex outline. It is assumed that the cutter outline of FIG. 14 is such as to require a substantial degree of eccentricity of the eccentric driving sleeves 48 and 50 and associated offset spindle extensions 84 and 88. FIG. 15 illustrates a cutter 126 having a convex semi-circular outline, which is shaped on a grinding wheel 128 having a concaved semi-circular outline. It is assumed that the cutter outline of FIG. 15 will require the same degree of eccentricity of the eccentric driving sleeves 48 and 50 and associated off-set spindle extensions 84 and 88 as required for the grinding of the cutter shown in FIG. 14.

It is thus also seen from FIGS. 14 and 15 that either the work or the work shaping or grinding wheel, as the case may be, may be mounted on support 28 and thus oscillated to obtain the desired shapes depending on the most advantageous disposition of the members.

The invention having been described, what is claimed is:

1. A work shaping holder attachment having, in combination, a housing, a support carried on the housing for movement bodily in an oscillatory path for the work shaping of curved surfaces, supporting and actuating mechanism for said support comprising a plurality of parallel eccentric driving sleeves, external bearing supports for said eccentric sleeves mounted on said housing, spindles mounted within said eccentric sleeves to be oscillated bodily about the bearing axes of said external bearing supports along the eccentric radii of said sleeves, each spindle having a bearing connection with said support eccentric to the rotational axis of said spindle, a fastening device for securing each said spindle to turn as a unit with the supporting eccentric driving sleeve, means for maintaining said eccentric sleeves in correct angular relationship and for driving said sleeves at the same rate, and means for effecting identical angular adjustments of said spindles within said sleeves, thereby to vary the oscillatory radius of movement of said support about said external bearing supports.

2. The combination of claim 1 in which crank arms of equal length are mounted on said spindles, and a tie rod is connected between said crank arms to maintain said spindles in a fixed angular relation to one another.

3. The combination of claim 2 in which a guiding device is provided for arresting rotational movement of said tie rod and spindles during a rotational movement of said sleeves thereby effecting adjustment of the eccentricity of said spindle eccentric bearing connections between maximum and minimum limits.

4. The combination of claim 3 in which a scale is provided on said housing for measuring the radius of oscillation by reference to the position of said tie rod relative to said scale.

5. A work shaping holder attachment according to claim 1 in which there is provided on said housing a stationary circular dial having thereon indications of direction about a central axis, a cooperating circular dial mounted on said support for oscillatory movement with said support about the stationary dial axis, said cooperating dial having thereon indications of direction matching the indications on said stationary dial for a position in which said spindle eccentric bearings are precisely centered in said matched indicator position.

6. A work shaping holder attachment according to claim 5 in which concentric circular markings on one said dial indicate the radius of oscillation by reference to the position of the other said dial relative to said circular markings.

7. The combination of claim 1, in which the support carried on the housing for movement bodily in an oscillatory path for the shaping of curved surfaces is a work support adapted for movement in said oscillatory path with relation to a rotating grinding wheel.

8. The combination of claim 2, in which the support carried on the housing for movement bodily in an oscillatory path, the parallel eccentric driving sleeves, the eccentrically mounted spindles, the crank arms, and spindle connecting tie rod define a work support adapted for movement in said oscillatory path with relation to a rotating grinding wheel.

9. The combination of claim 8, in which a device is provided for arresting rotational movement of said tie rod and spindles during a rotational movement of said sleeves thereby effecting adjustment of the eccentricity of said spindle eccentric bearing connections with relation to a rotating grinding wheel.

10. The combination of claim 8, in which the work piece is an arcuately concaved cutter subjected to the grinding operation of a convex grinding wheel.

References Cited

UNITED STATES PATENTS 2,772,670 12/1956 Jones _____ 125—11
2,875,557 3/1959 Heymes _____ 51—119
3,076,295 2/1963 Folley _____ 51—90

HAROLD D. WHITEHEAD, *Primary Examiner.*